(12) United States Patent
Austrheim (10) Patent No.: US 12,145,799 B2
(45) Date of Patent: Nov. 19, 2024

(54) AUTOMATED STORAGE AND RETRIEVAL SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 18/340,384

(22) Filed: Jun. 23, 2023

(65) Prior Publication Data

US 2023/0331480 A1 Oct. 19, 2023

Related U.S. Application Data

(63) Continuation of application No. 17/655,308, filed on Mar. 17, 2022, now Pat. No. 11,713,189, which is a
(Continued)

(30) Foreign Application Priority Data

Oct. 24, 2017 (NO) .................................. 20171698

(51) Int. Cl.
*B65G 1/04* (2006.01)
*B65G 1/06* (2006.01)
*B66F 9/06* (2006.01)

(52) U.S. Cl.
CPC ........... *B65G 1/0464* (2013.01); *B65G 1/065* (2013.01); *B66F 9/063* (2013.01)

(58) Field of Classification Search
CPC ........ B65G 1/0464; B65G 1/065; B66F 9/063
See application file for complete search history.

(56) References Cited

U.S. PATENT DOCUMENTS

| 4,088,232 A | 5/1978 | Lilly |
| 4,158,416 A | 6/1979 | Podesta |

(Continued)

FOREIGN PATENT DOCUMENTS

| CN | 1154332 A | 7/1997 |
| CN | 101503141 A | 8/2009 |

(Continued)

OTHER PUBLICATIONS

International Search Report issued in PCT/EP2018/072968 mailed on Nov. 30, 2018 (7 pages).
(Continued)

*Primary Examiner* — Saul Rodriguez
*Assistant Examiner* — Ashley K Romano
(74) *Attorney, Agent, or Firm* — Baker Botts L.L.P.

(57) ABSTRACT

A floor element for an automated storage and retrieval system, which comprises a three-dimensional grid, a plurality of container handling vehicles, and multiple floor elements, each floor element arrangeable at a top end of a storage column on top of a vertical stack of containers, includes an upper surface with a substantially rectangular horizontal periphery suitable for being accommodated in a storage column. The floor element further includes lifting frame connecting elements, for releasable connection to a lifting frame, on a peripheral top section of the upper surface and a cut-out at each corner of the substantially rectangular horizontal periphery for interaction with guiding pins arranged on the lifting frame, and rail-connecting elements at the substantially rectangular horizontal periphery.

10 Claims, 10 Drawing Sheets

Related U.S. Application Data continuation of application No. 16/758,157, filed as application No. PCT/EP2018/072968 on Aug. 27, 2018, now Pat. No. 11,299,345.

(56) References Cited

U.S. PATENT DOCUMENTS

| | | | |
|---|---|---|---|
| 6,074,155 | A | 6/2000 | Hirschek |
| 9,561,941 | B1 | 2/2017 | Watts |
| 9,582,001 | B1 | 2/2017 | Holmberg et al. |
| 9,715,232 | B1 | 7/2017 | Fischer et al. |
| 9,827,683 | B1 | 11/2017 | Hance et al. |
| 2012/0189411 | A1 | 7/2012 | Yoshinaga |
| 2012/0330458 | A1* | 12/2012 | Weiss ............... B66F 9/063 901/1 |
| 2014/0074341 | A1* | 3/2014 | Weiss ............... B66F 9/0755 701/25 |
| 2017/0183159 | A1* | 6/2017 | Weiss ............... B66F 9/0755 |
| 2017/0305668 | A1 | 10/2017 | Bestic et al. |
| 2018/0265298 | A1* | 9/2018 | Wagner ............... B65G 1/1378 |
| 2019/0291951 | A1 | 9/2019 | Iellimo |
| 2021/0229909 | A1* | 7/2021 | Austrheim ............... G05D 1/0291 |
| 2023/0219756 | A1* | 7/2023 | Walet ............... B65G 1/0492 414/286 |

FOREIGN PATENT DOCUMENTS

| | | |
|---|---|---|
| CN | 102482035 A | 5/2012 |
| CN | 105059811 A | 11/2015 |
| CN | 106029529 A | 10/2016 |
| CN | 106414278 A | 2/2017 |
| EP | 2346772 A1 | 7/2011 |
| GB | 2547805 A | 8/2017 |
| JP | 2011-20778 A | 2/2011 |
| JP | 2017-512166 A | 5/2017 |
| NO | 317366 B1 | 10/2004 |
| WO | 2011/007667 A1 | 1/2011 |
| WO | 2014/090684 A1 | 6/2014 |
| WO | 2015/124610 A1 | 8/2015 |
| WO | 2015/193278 A1 | 12/2015 |
| WO | 2016/193419 A1 | 12/2016 |
| WO | 2017/121512 A1 | 7/2017 |
| WO | 2017/129384 A1 | 8/2017 |

OTHER PUBLICATIONS

Written Opinion of the International Searching Authority issued in PCT/EP2018/072968 mailed on Nov. 30, 2018 (9 pages).
Norwegian Search Report issued in NO 20171698 mailed on May 24, 2018 (2 pages).
Office Action issued in Chinese Application NO 201880062404X; Dated Feb. 2, 2021 (10 pages).
Office Action in counterpart Japanese Patent Application No. 2020-522675 issued on Jun. 2, 2021 (14 pages).
European Patent Office, Extended European Search Report for EP Application No. 23150617.1-1017, mailed Apr. 3, 2023, 6 pages.
Search Report issued in Chinese Application No. 202111437078.6, mailed Mar. 30, 2024, 3 pages.

* cited by examiner

AUTOMATED STORAGE AND RETRIEVAL SYSTEM

TECHNICAL FIELD

The present invention relates to the field of automated storage and retrieval systems.

Background and Prior Art

Figure 1:
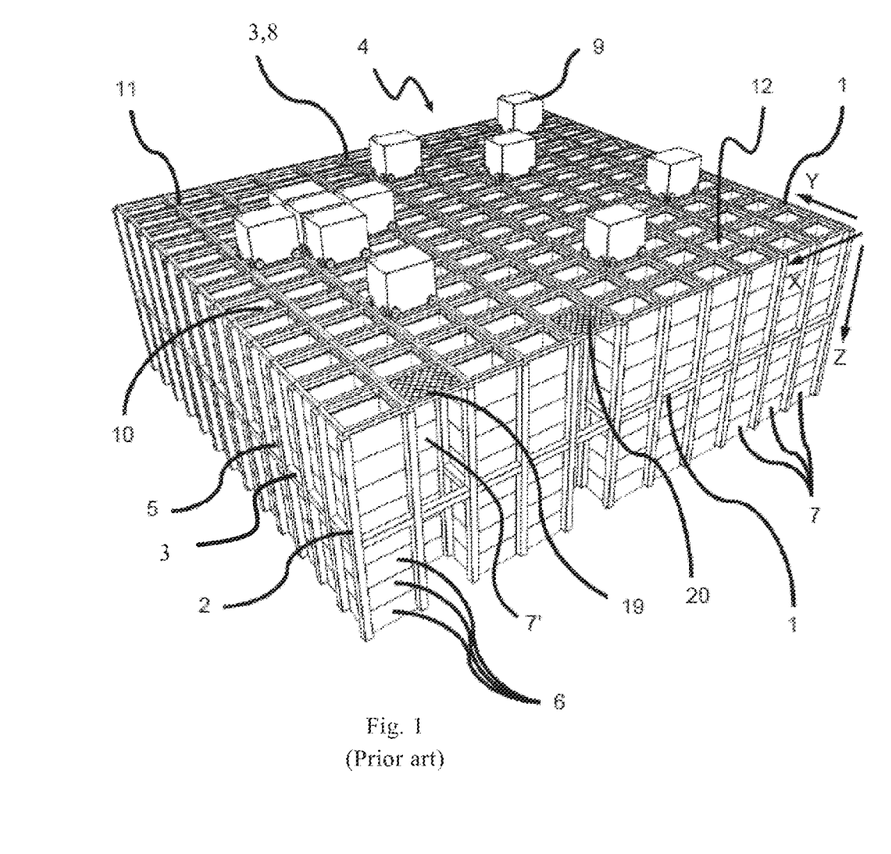
FIG. 1 is a perspective side view of a prior art storage and retrieval system.

The Applicant's already known AutoStore system is a storage system comprising a three-dimensional storage grid structure wherein storage bins/containers are stacked on top of each other to a certain height. Such a prior art system is shown in FIG. 1. The storage system is disclosed in detail in for instance NO317366 and WO 2014/090684 A1.

Figure 2A:
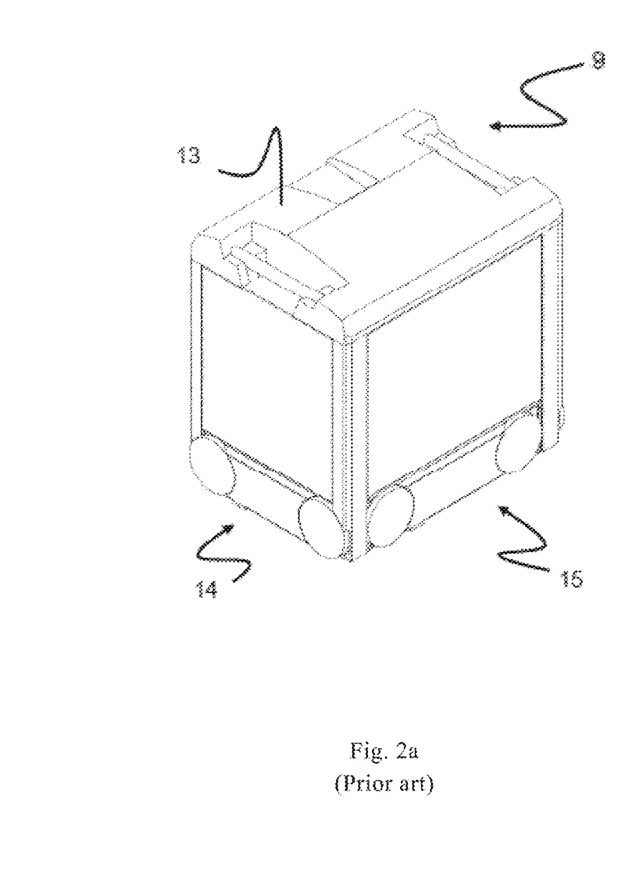
FIGS. 2a and 2b depict two different prior art container handling vehicles.
Figure 2B:
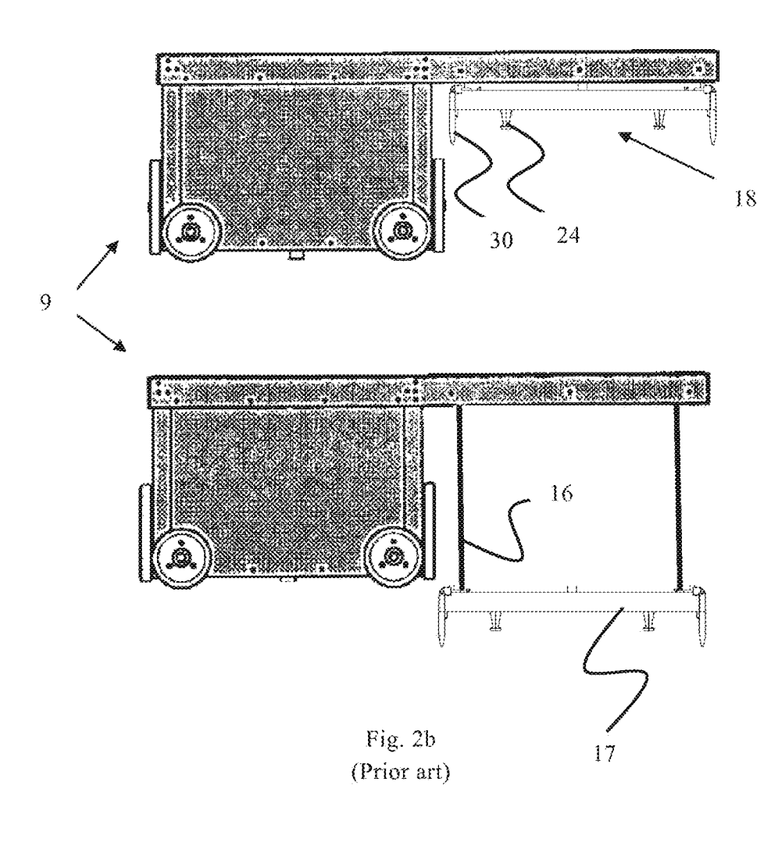

FIG. 1 discloses a framework structure 1 of a typical prior art automated storage and retrieval system and FIGS. 2a and 2b disclose known container-handling vehicles of such a system.

The framework structure 1 comprises a plurality of upright members 2 and a plurality of horizontal members 3, which are supported by the upright members 2. The members 2, 3 may typically be made of metal, e.g., extruded aluminium profiles.

The framework structure 1 defines a storage grid 4 comprising storage columns 5 arranged in rows, in which storage columns 5 storage containers 6, also known as containers, are stacked one on top of another to form stacks 7. Each storage container 6 (or container for short) may typically hold a plurality of product items (not shown), and the product items within a storage container 6 may be identical or may be of different product types depending on the application. The framework structure 1 guards against horizontal movement of the stacks 7 of storage containers 6, and guides vertical movement of the containers 6, but does normally not otherwise support the storage containers 6 when stacked.

The upper horizontal members 3 comprise a rail system 8 arranged in a grid pattern across the top of the storage columns 5, on which rail system 8 a plurality of container-handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container-handling vehicles 9 in a first direction X across the top of the frame structure 1, and a second set of parallel rails 11 arranged perpendicular to the first set of rails 10 to guide movement of the container-handling vehicles 9 in a second direction Y, which is perpendicular to the first direction X, see FIG. 3. In this way, the rail system 8 defines an upper end of grid columns 12 above which the container-handling vehicles 9 can move laterally above the storage columns 5, i.e. in a plane, which is parallel to the horizontal X-Y plane.

Each container-handling vehicle 9 comprises a vehicle body 13 and first and second sets of wheels 14, 15 which enable the lateral movement of the container-handling vehicle 9, i.e., the movement in the X and Y directions. In FIG. 2, two wheels in each set are visible. The first set of wheels 14 is arranged to engage with two adjacent rails of the first set 10 of rails, and the second set of wheels 15 arranged to engage with two adjacent rails of the second set 11 of rails. One of the set of wheels 14, 15 can be lifted and lowered, so that the first set of wheels 14 and/or the second set of wheels 15 can be engaged with their respective set of rails 10, 11 at any one time.

Each container-handling vehicle 9 also comprises a lifting device 18 (not shown in FIGS. 1 and 2a) for vertical transportation of storage containers 6, e.g., raising a storage container 6 from and lowering a storage container 6 into a storage column 5. The lifting device 18 comprises a lifting frame (not shown in FIG. 2a, but similar to the one shown in FIG. 2b labelled 17) which is adapted to engage a storage container 6, which lifting frame can be lowered from the vehicle body 13 so that the position of the lifting frame with respect to the vehicle body 13 can be adjusted in a third direction Z, which is orthogonal the first direction X and the second direction Y.

Conventionally, and for the purpose of this application, Z=1 identifies the uppermost layer of the grid 4, i.e. the layer immediately below the rail system 8 (in the present application, the rail system 8 is termed the top level of the grid), Z=2 is the second layer below the rail system 8, Z=3 is the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container-handling vehicles 9 can be said to travel in layer Z=0 and each grid column can be identified by its X and Y coordinates.

Each container-handling vehicle 9 comprises a storage compartment or space for receiving and stowing a storage container 6 when transporting the storage container 6 across the grid 4. The storage space may comprise a cavity arranged centrally within the vehicle body 13, e.g., as is described in WO2014/090684A1, the contents of which are incorporated herein by reference.

Alternatively, the container-handling vehicles may have a cantilever construction, as is described in NO317366, the contents of which are also incorporated herein by reference.

The container-handling vehicles 9 may have a footprint, i.e., an extent in the X and Y directions, which is generally equal to the lateral or horizontal extent of a grid column 12, i.e. the extent of a grid column 12 in the X and Y directions, e.g. as is described in WO2015/193278A1, the contents of which are incorporated herein by reference. Alternatively, the container-handling vehicles 9 may have a footprint which is larger than the lateral extent of a grid column 12, e.g., as is disclosed in WO2014/090684A1.

Figure 3:
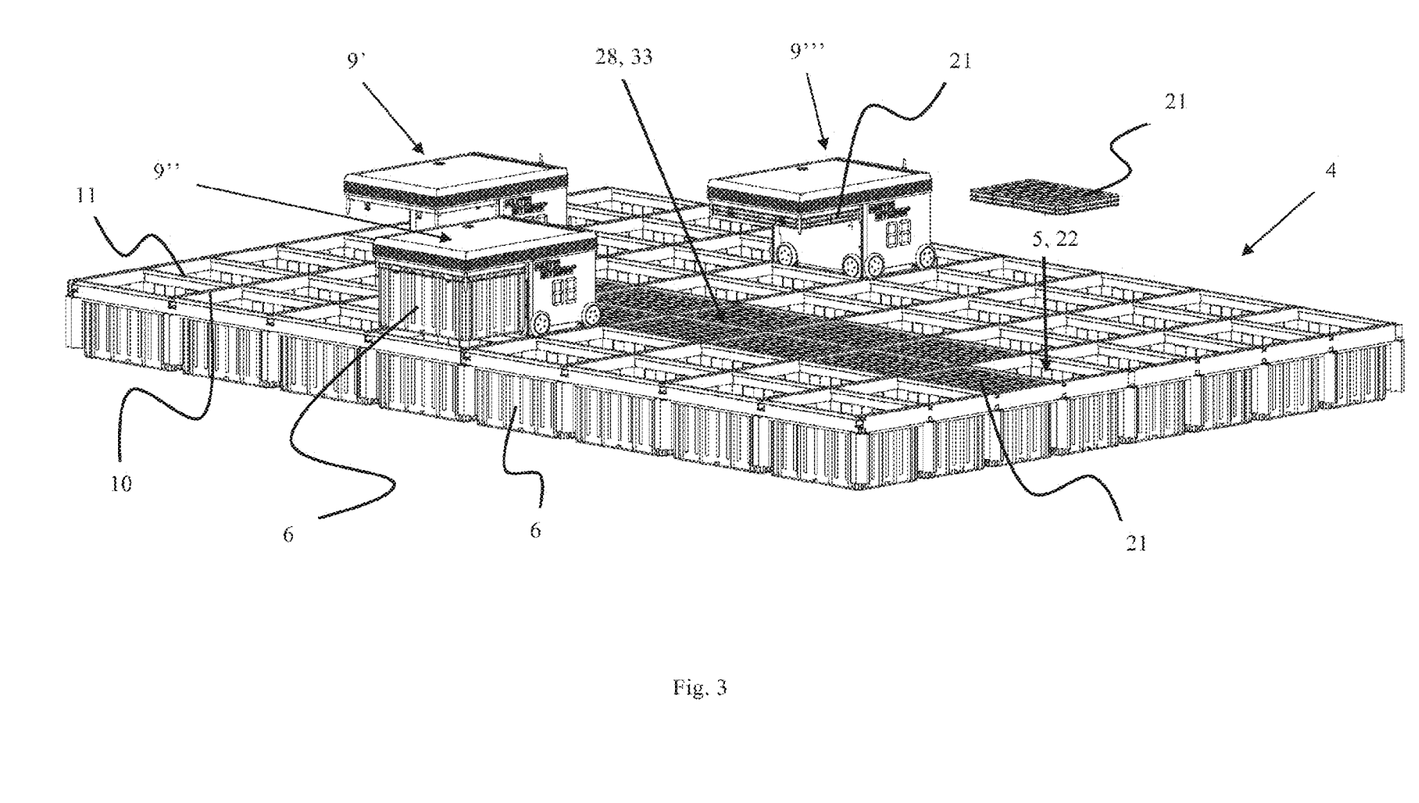
FIG. 3 is a perspective side view of an exemplary storage and retrieval system according to the invention.

The rail system 8 may be a single rail system, as is shown in FIG. 3. Alternatively, the rail system 8 may be a double rail system, as is shown in FIG. 4, thus allowing a container-handling vehicle 9 having a footprint 44 generally corresponding to the lateral extent of a grid column 12 to travel along a row of grid columns in either an X or Y direction even if another container-handling vehicle 9 is positioned above a grid column neighbouring that row.

In a storage grid, a majority of the grid columns 12 are storage columns 5, i.e., grid columns where storage containers are stored in stacks. However, a grid normally has at least one grid column which is used not for storing storage containers, but which comprises a location where the container-handling vehicles can drop off and/or pick up storage containers so that they can be transported to an access station where the storage containers can be accessed from outside of the grid or transferred out of or into the grid, i.e., a container handling station. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container-handling vehicles 9 can drop off storage containers to be transported to an access or a transfer station (not shown), and the second port 20 column may be a dedicated pick-up port column where the container-handling vehicles 9 can pick up storage containers that have been transported to the grid 4 from an access or a transfer station.

When a storage container 6 stored in the grid 4 disclosed in FIG. 1 is to be accessed, one of the container-handling vehicles 9 is instructed to retrieve the target storage container from its position in the grid 4 and transport it to the drop-off port 19. This operation involves moving the container-handling vehicle 9 to a grid location above the storage column in which the target storage container is positioned, retrieving the storage container from the storage column using the container-handling vehicle's lifting device (not shown, being internally arranged in a central cavity of the vehicle, but similar to the lifting device 18 of the second prior art vehicle of FIG. 2b), and transporting the storage container to the drop-off port 19. A second prior art vehicle 9 is shown in FIG. 2b to better illustrate the general design of the lifting device. Details of the second vehicle 9 are described in the Norwegian patent NO317366. The lifting devices 18 of both prior art vehicles 9 comprise a set of lifting bands 16 connected close to the corners of a lifting frame 17 (may also be termed a gripping device) for releasable connection to a storage container. To raise or lower the lifting frame 17 (and optionally a connected storage container), the lifting bands 16 are spooled on/off at least one rotating lifting shaft (not shown) arranged in the container-handling vehicle. Various designs of the at least one lifting shaft are described in for instance WO2015/193278 A1 and PCT/EP2017/050195. The lifting frame features container connecting elements 24 for releasably connecting to a storage container, and guiding pins 30. If the target storage container is located deep within a stack 7, i.e., with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container-handling vehicle that is subsequently used for transporting the target storage container to the drop-off port 19, or with one or a plurality of other cooperating container-handling vehicles. Alternatively, or in addition, the automated storage and retrieval system may have container-handling vehicles specifically dedicated to the task of temporarily removing storage containers from a storage column. Once the target storage container has been removed from the storage column, the temporarily removed storage containers can be repositioned into the original storage column. However, the removed storage containers may alternatively be relocated to other storage columns.

When a storage container 6 is to be stored in the grid 4, one of the container-handling vehicles 9 is instructed to pick up the storage container from the pick-up port 20 and transport it to a grid location above the storage column where it is to be stored. After any storage containers positioned at or above the target position within the storage column stack have been removed, the container-handling vehicle 9 positions the storage container at the desired position. The removed storage containers may then be lowered back into the storage column or relocated to other storage columns.

For monitoring and controlling the automated storage and retrieval system, e.g. monitoring and controlling the location of respective storage containers within the grid 4, the content of each storage container 6 and the movement of the container-handling vehicles 9 so that a desired storage container can be delivered to the desired location at the desired time without the container-handling vehicles 9 colliding with each other, the automated storage and retrieval system comprises a control system, which typically is computerised and comprises a database for keeping track of the storage containers.

A problem with automated storage and retrieval systems, as described above, is the difficulty in manually accessing equipment arranged on the grid when the equipment needs service. Such equipment includes container-handling vehicles, charging stations for container-handling vehicles etc. For instance, if a container-handling vehicle stops working while being out on the grid, there is no easy way for service personnel to reach the vehicle. One option is to use a service vehicle unit, which is a manually driven personnel vehicle. However, these vehicles are bothersome to use and does not allow the operator to transport any required equipment out on the grid. Further, the area surrounding equipment in need of service is usually made up of open ended storage columns, making the service work difficult to perform, at least in a secure manner.

The present invention provides an automated storage and retrieval system, wherein equipment arranged on the grid and in need of service may easily be accessed.

SUMMARY OF THE INVENTION

The present invention is defined in the attached claims and in the following:

In a first aspect, the present invention provides an automated storage and retrieval system comprising a three-dimensional grid and a plurality of container handling vehicles, wherein the three-dimensional grid comprises multiple storage columns, in which containers may be stored on top of one another in vertical stacks; and each container handling vehicle comprises a container lifting device having a lifting frame, for releasably connecting to a container, and is operated on rails at a top level of the grid for retrieving containers from, and storing containers in, the storage columns, and for transporting the containers horizontally across the grid; wherein the automated storage system comprises multiple floor elements, each floor element arrangeable at a top end of a storage column on top of a vertical stack of containers (i.e. each floor element is supported by a stack of containers), such that an operator may stand on top of the storage column and wherein the floor elements may be stored on top of one another in a vertical stack arranged in a storage column in the grid. Alternatively, each floor element may be defined as being arrangeable at a top end of a storage column, such that the operator may stand on top of the floor element or such that the operator may stand on the floor element on top of the storage column. In other words, the floor element allows the operator to stand at the top level of the grid on top of the storage column.

In an embodiment of the automated storage and retrieval system, each of the floor elements may be transported and arranged at the top end of a storage column by use of a vehicle arranged at the top level of the grid. The vehicle may be a dedicated floor element handling vehicle (i.e., a vehicle only suitable for handling floor elements not containers) or preferably a container handling vehicle. Preferably, the floor element comprises an upper surface and is arranged such that the level of the upper surface is at, or (slightly) below, an upper level of the rails.

In an embodiment of the automated storage and retrieval system, each of the floor elements is releasably connectable to the lifting frame of the container handling vehicles.

In an embodiment of the automated storage and retrieval system, each of the floor elements has a horizontal periphery substantially corresponding to a horizontal periphery of the containers. The horizontal periphery allows a floor element to be accommodated between the rails arranged at the top end of the storage column. In a further embodiment, the maximum horizontal dimensions of each floor element are substantially equal to the maximum horizontal dimensions of the containers.

In an embodiment of the automated storage and retrieval system, the floor elements comprise side walls having a height adapted to arrange the upper surface of the floor element at a level equal to, or slightly below, the upper level of the rails.

In an embodiment of the automated storage and retrieval system, the lifting frame comprises container connecting elements for releasable connection to corresponding lifting frame connecting elements on any of a peripheral top section of the containers and a peripheral top section of the floor elements. A peripheral top section is intended to mean a section of a top surface extending inwards from a peripheral edge.

In an embodiment of the automated storage and retrieval system, the floor elements have the same lifting frame connecting interface as the containers. In particular, the floor elements and the containers comprise lifting frame connecting elements for releasable connection to the lifting frame.

In an embodiment of the automated storage and retrieval system, each of the floor elements is arrangeable on top of a vertical stack of containers, i.e. such that the floor element is supported on top of the stack.

In an embodiment of the automated storage and retrieval system, each of the floor elements comprises rail-connecting elements at the horizontal periphery, the rail-connecting elements being able to connect to the rails at the top end of a storage column, such that the floor element is held at a desired level relative the top level of the grid. Depending on the design, the rail connecting elements may entail that the floor elements must be stored in a dedicated column having a cross-section able to accommodate a floor element having a larger cross-section than the containers.

In an embodiment of the automated storage and retrieval system, the floor elements are arrangeable such that a container handling vehicle is able to pass over a section of adjacent storage columns, when each of the adjacent storage columns features a 35 floor element at the top end. In other words, the floor elements are arrangeable at a horizontal level allowing a container handling vehicle to pass above and beside them.

In an embodiment of the automated storage and retrieval system, the containers and floor elements have different and contrasting colours, such that a formed walkway is colour-wise easily distinguishable for an operator. Preferably, the containers are grey, while the floor elements are in a highly contrasting colour relative to grey, such as red, orange, blue or green.

In a second aspect, the present invention provides a floor element for an automated storage and retrieval system according to the first aspect, wherein the floor element has an upper surface with a substantially rectangular horizontal periphery suitable for being accommodated in a storage column, and comprises lifting frame connecting elements, for releasable connection to a lifting frame, arranged on a peripheral top section of the upper surface and a cut-out or recess at each corner of the horizontal periphery for interaction with guiding pins arranged on the lifting frame. Preferably, the floor element comprises two lifting frame connecting elements at each of two parallel and/or opposite sides of the upper surface. The floor element has a lower surface (e.g., bottom surface) suitable for being supported on top of a container.

The upper surface is preferably textured to provide improved grip.

In an embodiment of the floor element, the lifting frame connecting elements comprise rectangular holes in the upper surface.

In an embodiment, the floor element comprises side walls interconnected by a grid of multiple ribs.

In a preferred embodiment, the upper surface is supported from below by the grid of multiple ribs interconnecting the side walls.

In an embodiment of the floor element, the side walls comprise a horizontal rib and multiple vertical ribs, the ribs arranged on the outwards facing side of the side walls. Preferably, the horizontal rib comprises rectangular holes in line with the rectangular holes in the upper surface forming part of the lifting frame connecting elements.

In an embodiment, the floor element has a colour chosen from the group of red, orange, yellow, green, and blue, preferably red, orange and yellow.

In a third aspect, the present invention relates to a method of providing access, i.e., manual access by an operator, to equipment arranged at, or accessible from, the top level of an automated storage and retrieval system comprising a three-dimensional grid and a plurality of container handling vehicles, wherein the three-dimensional grid comprises multiple storage columns, in which containers may be stored on top of one another in vertical stacks; and each container handling vehicle comprises a container lifting device having a lifting frame, for releasably connecting to a container, and is operated on rails at a top level of the grid for retrieving containers from, and storing containers in, the storage columns, and for transporting the containers horizontally across the grid; wherein the automated storage system comprises multiple floor elements, each floor element arrangeable at a top end of a storage column, such that an operator may stand on top of the storage column, the method comprising the steps of:

identifying a set of adjacent storage columns forming a continuous section between an operator accessible part of the top level of the grid and the equipment; and arranging a floor element at the top end of each storage column in the set of adjacent storage columns, such that a walkway is formed between the operator accessible part of the top level of the grid and the equipment.

The equipment may for instance be, but not restricted to, a container-handling vehicle, a charging station for container-handling vehicles, a storage container stuck in a storage column etc.

An operator accessible part of the grid is a part which an operator may easily reach, for instance by a platform arranged at the periphery of, or being a part of, the top level of the grid.

In an embodiment of the method, the step of arranging a floor element at a top end of each storage column in the set of adjacent storage columns is performed by at least one vehicle arranged at the top level of the grid, preferably, the at least one vehicle is a container-handling vehicle.

In an embodiment, the method comprises a step of directing at least one of the container-handling vehicles to transfer at least one container into one of the adjacent storage columns, such that the storage column is full of containers before a floor element is arranged at the top end. Preferably, the step of directing at least one of the container-handling vehicles to transfer at least one container into one of the adjacent storage columns is repeated until all of the adjacent storage columns are full of containers.

In an embodiment of the method, the floor element arranged at the top end of a storage column is supported on top of an uppermost container accommodated in the storage column, i.e., the floor element is supported on top of a stack of containers accommodated in the storage column.

In an embodiment of the method, the storage system may comprise any of the features of the embodiments of the first aspect.

In an embodiment of the invention, the continuous section of adjacent storage columns extends at least partially around the equipment to be accessed. In this manner, the method not only provides access to the equipment, but also a work surface upon which the operator may move at least partially around the equipment.

BRIEF DESCRIPTION OF THE DRAWINGS

Certain embodiments of the present invention will now be described in detail by way of example only and with reference to the following drawings:

FIG. 4b is a perspective bottom view of the floor element in FIG. 4a.

FIG. 5b is an enlarged top side view of a section A of the system in FIG. 5a.

FIG. 7a is a side view of a section B of the system in FIG. 5a.

FIG. 7b is an enlarged top side view of a section B of the system in FIG. 5a.

In the drawings, like reference numerals have been used to indicate like parts, elements or features unless otherwise explicitly stated or implicitly understood from the context.

DETAILED DESCRIPTION OF THE INVENTION

In the following, embodiments of the invention will be discussed in more detail by way of example only and with reference to the appended drawings. It should be understood, however, that the drawings are not intended to limit the invention to the subject-matter depicted in the drawings.

As mentioned above, a disadvantage of prior art automated storage and retrieval systems, see FIG. 1, is the difficulty in manually accessing various equipment arranged at, or accessible from, the top level of the system for the purpose of performing service or repairs. Such equipment includes for instance container-handling vehicles 9, charging stations (not shown) for container-handling vehicles and other vehicles, storage containers 6 stuck in a storage column 5 etc. For instance, if a container-handling vehicle 9 stops working while being out on the grid 4, there is no easy way for service personnel (i.e., an operator) to reach the vehicle for performing the necessary repairs or service.

An embodiment of an automated storage and retrieval system (hereinafter termed a storage system) according to the invention is shown in FIGS. 3 and 5-8. For illustrative purposes, only an upper layer of storage containers 6 (alternatively an upper part of a storage grid 4) is shown in FIG. 3. The inventive storage system is in most respects similar to the prior art system shown in FIG. 1, i.e., it features a three-dimensional grid 4 and multiple container handling vehicles 9', 9'', 9'''. The three-dimensional grid 4 comprises multiple storage columns 5, in which the storage containers 6 may be stored on top of one another in vertical stacks 7, see FIG. 7a.

Further details of relevant prior art storage systems and container-handling vehicles are disclosed in for instance NO317366 and WO 2014/090684 A1, and are hereby incorporated by reference.

In this embodiment the container handling vehicles 9', 9'', 9''' are similar to the prior art vehicle shown in FIG. 2b. Each container handling vehicle 9', 9'', 9''' comprises a container lifting device 18 having a lifting frame 17 for releasably connecting either of a container 6 and a floor element 21, and is operated on the rails 10, 11 arranged at a top level of the grid 4. During normal operations, the container handling vehicles are used for retrieving containers 6 from, and storing containers 6 in, the storage columns 5, and are able to transport the containers 6 horizontally across the grid 4.

Figure 9:
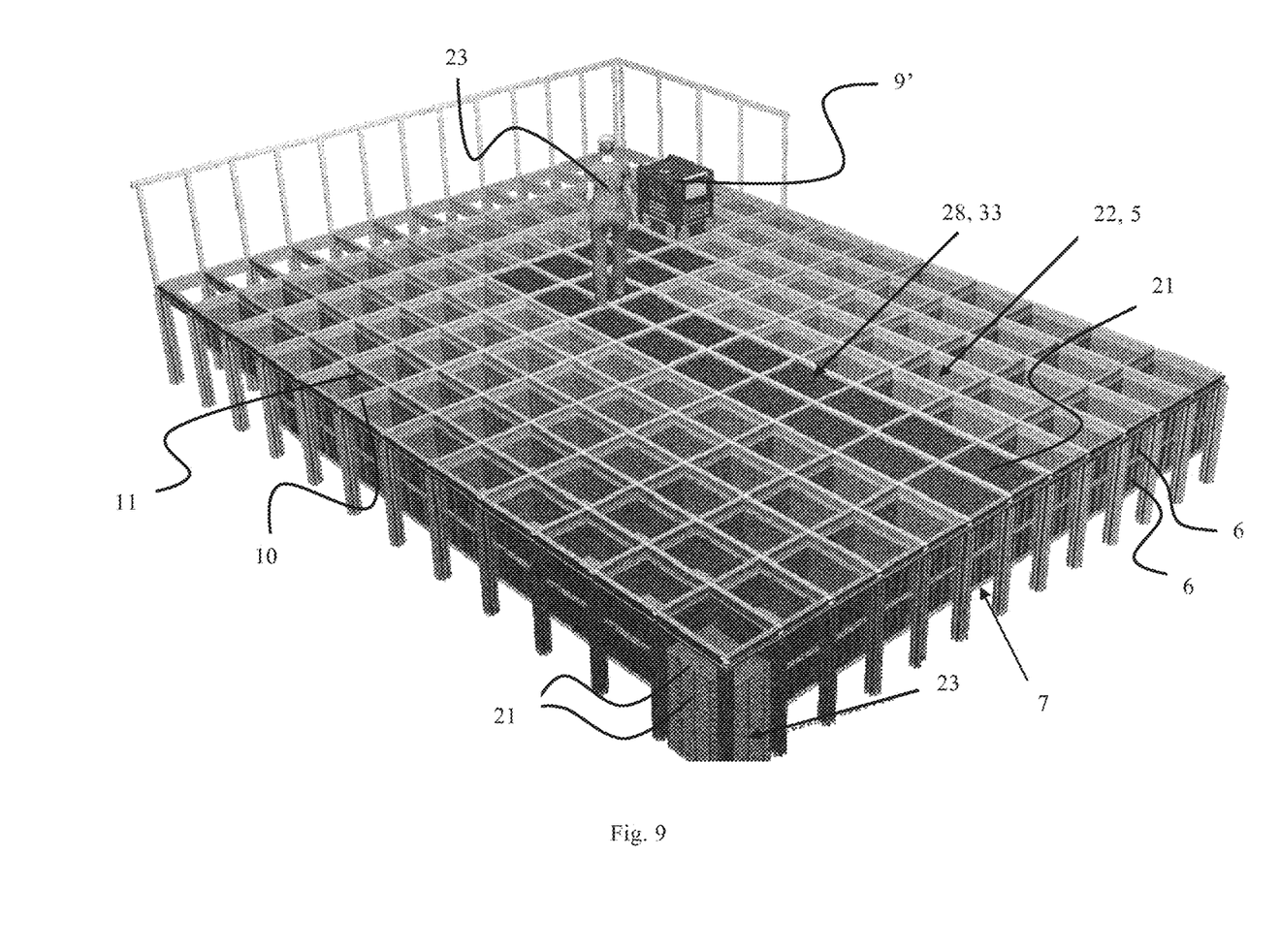
FIG. 9 is a perspective side view of an exemplary storage and retrieval system according to the invention, wherein a stack of floor elements is shown stored in a storage column.

To provide an operator 23, see FIG. 9, easy access to equipment arranged at, or accessible from, the top level of the grid, the inventive system comprises multiple floor elements 21. Each of the floor elements is arrangeable at a top end 22 of one of the storage columns, and is designed such that an operator 23 may safely stand on the floor element 21 on top of the storage column 5.

Figure 4A:
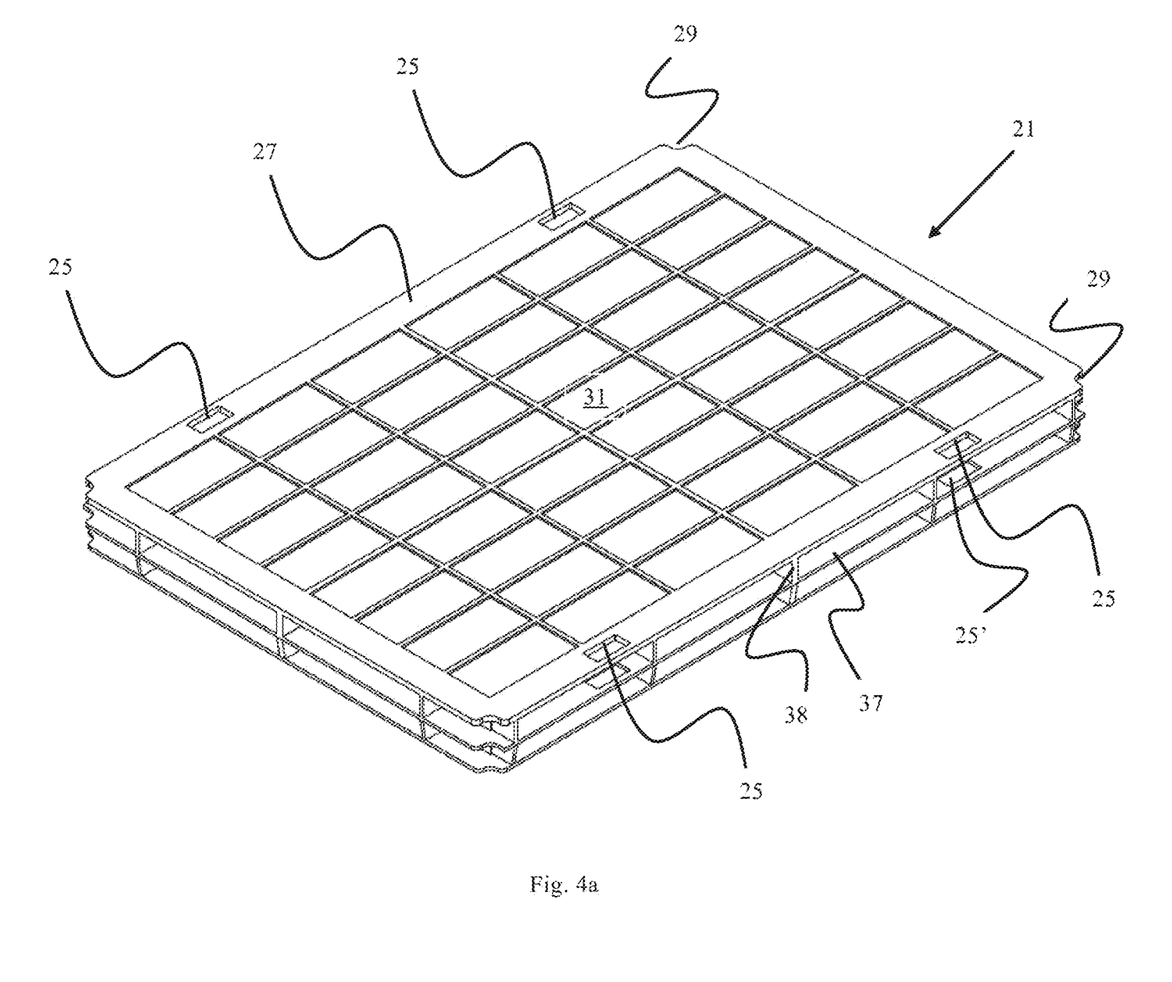
FIG. 4a is a perspective top side view of an exemplary floor element according to the invention.
Figure 4B:
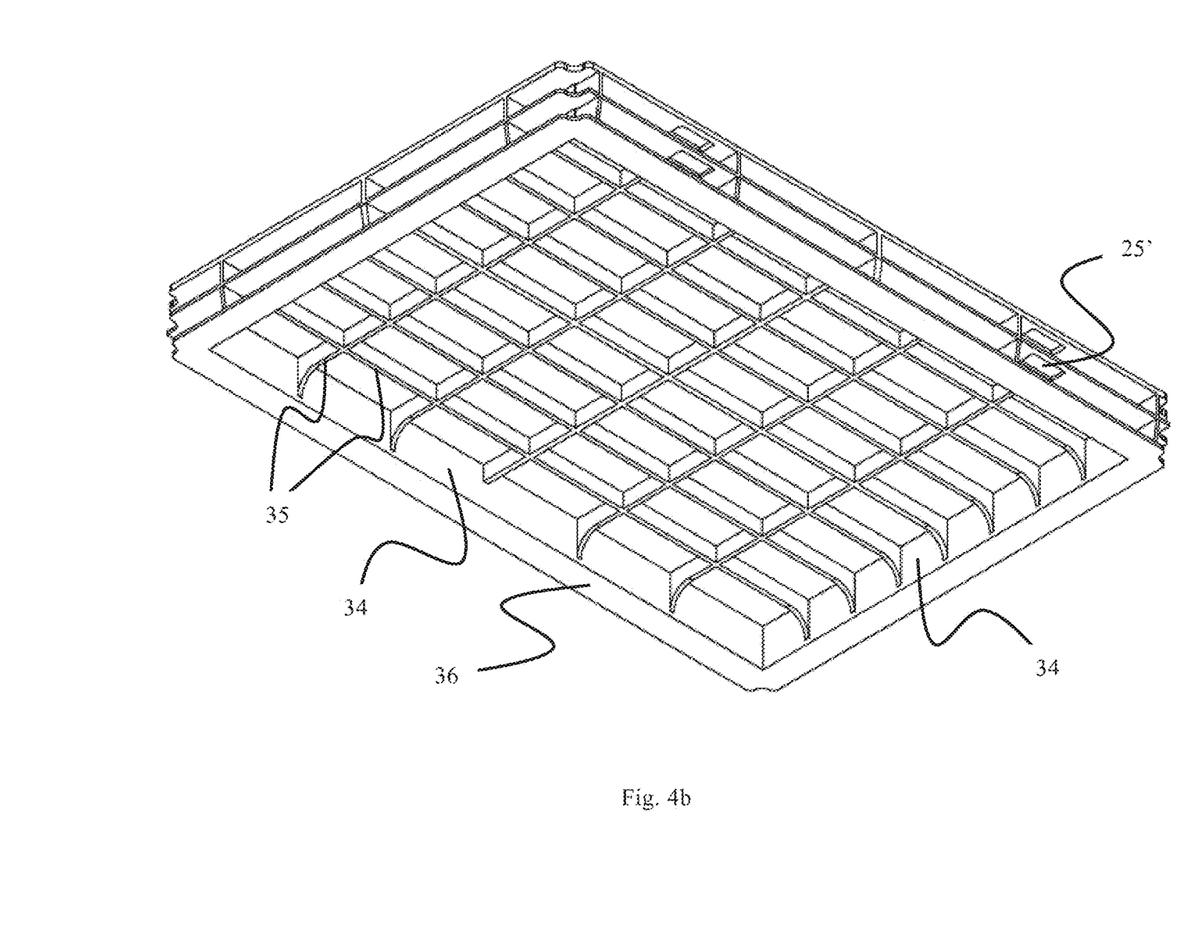
Figure 5A:
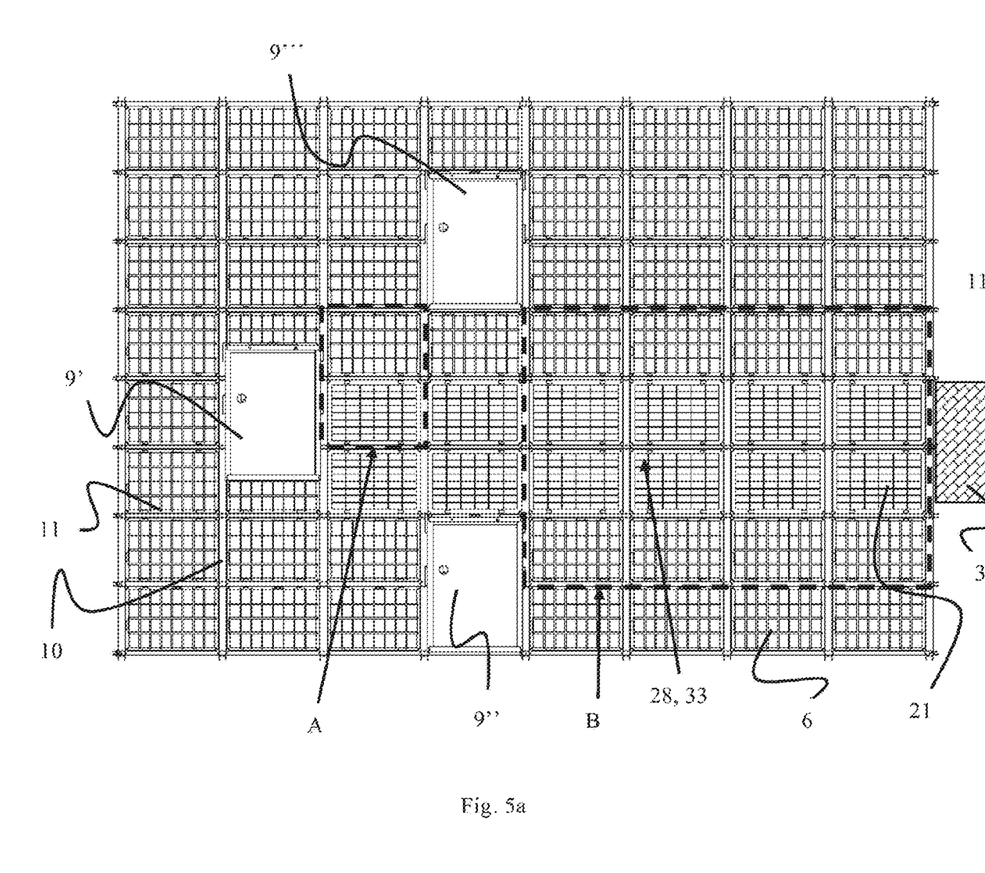
FIG. 5a is a top side view of the storage and retrieval system in FIG. 3 with a plurality of floor elements in place.
Figure 5B:
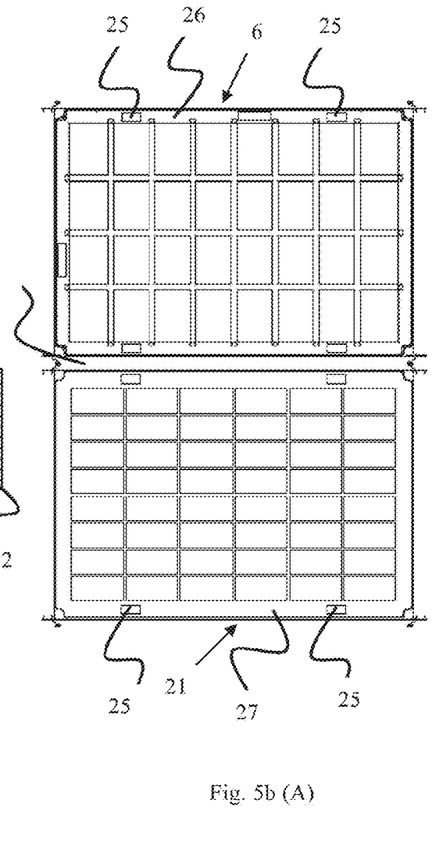
Figure 6:
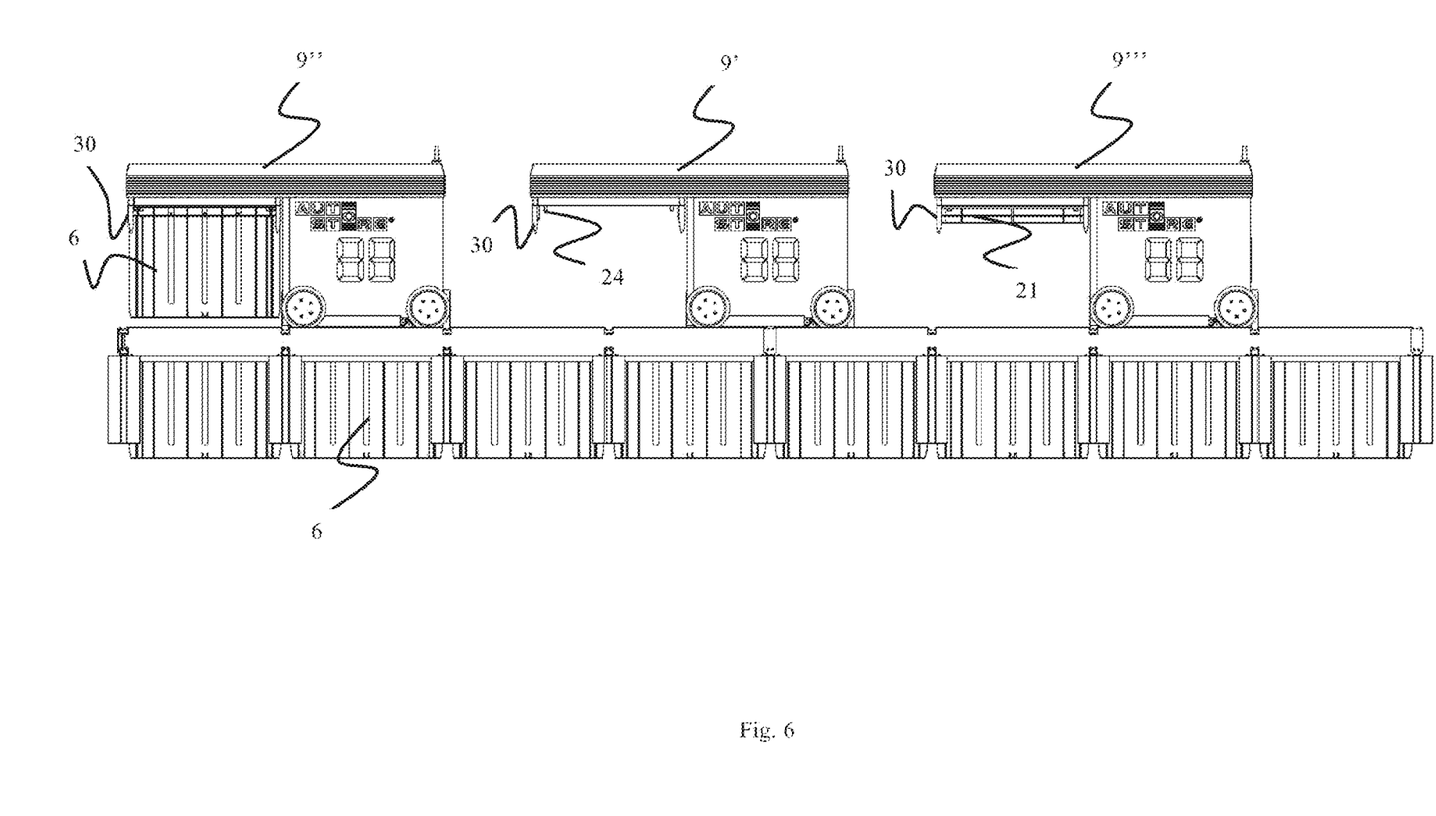
FIG. 6 is a side view of the storage and retrieval system in FIG. 3.
Figure 7A:
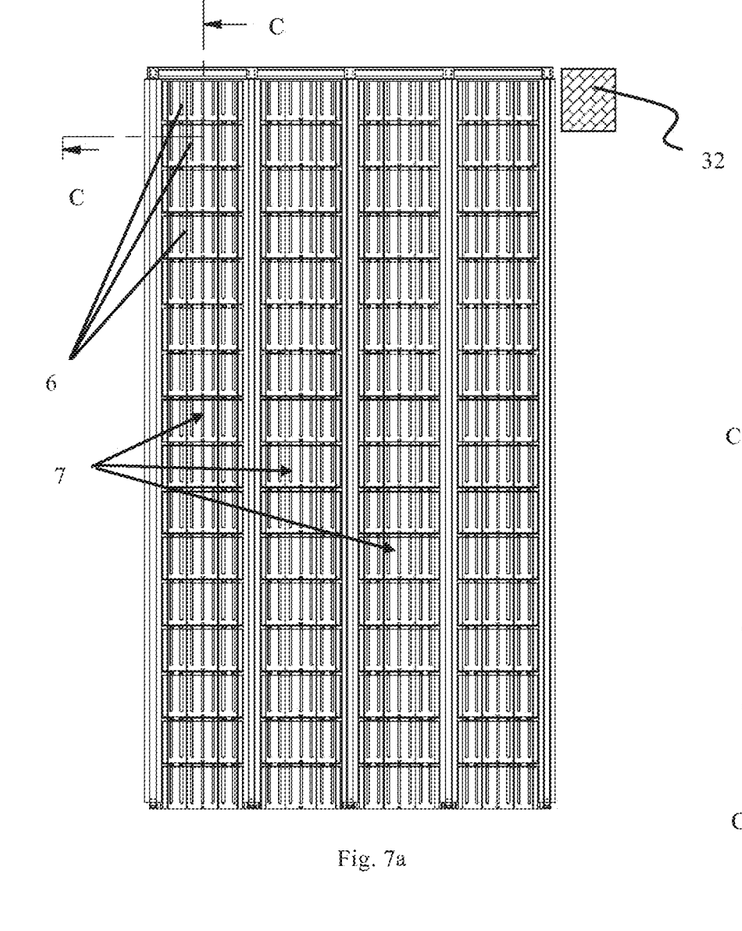
Figure 7B:
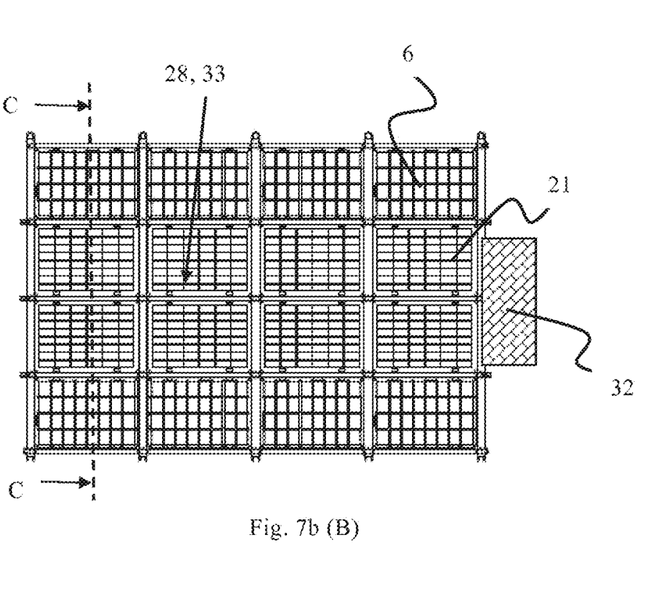

Each floor element, see FIGS. 4a and 4b, has an upper surface 31 (i.e., a floor or walking surface) with a substantially rectangular horizontal periphery suitable for being accommodated at the top end 22 of one of the storage columns 5. In the present embodiment, the horizontal periphery is substantially equal to the periphery of the containers, thus allowing the floor elements to be stacked and stored within one of the storage columns 5. Four lifting frame connecting elements 25, 25' for releasable connection to the lifting frame 18 of a container-handling vehicle 9''', via the corresponding container connecting elements 24, are arranged on a peripheral top section 27 of the upper surface 31, i.e., the floor elements 21 have the same lifting frame connecting interface as the containers 6. In this particular embodiment, the lifting frame connecting elements 25, 25' are rectangular holes for interaction with releasable hooks 24 on the lifting frame 17. However, various similar technical solutions for such releasable connection will be obvious to the skilled person. In addition, the floor element 21 has a cut-out 29 at each corner of the horizontal periphery for interaction with guiding pins 30 arranged on the lifting frame 17.

To obtain a light floor element 21 having the required stiffness/strength, the floor element comprises vertical side walls 34 interconnected by a grid of multiple ribs 35. The side walls are further strengthened by a horizontal external rib 37 and multiple vertical ribs 38. The horizontal rib 37 comprises rectangular holes 25' forming part of the lifting frame connecting elements. A lower surface 36 of the side walls 34 are designed to be supported upon a container 6, such that the weight of an operator standing on the floor element is supported by the stack 7 of containers 6 upon which the floor element 21 is arranged. The floor elements 21 are preferably moulded in a suitable plastic material. The height of the floor element 21 (or the side walls 34) are preferably in the range of 50-100 millimeters (mm) to obtain a floor element having the required strength, while at the same time occupying a minimum of space when stacked in a storage column 5.

In the present embodiment, see FIG. 9, the equipment in need of repair/service is represented by a container handling vehicle 9' stalled upon the grid 4, and thus in need of repair/service. To provide an operator 23 with easy access to vehicle 9', the following steps are performed:

identifying a set of adjacent storage columns 5 forming a continuous section 28 between an operator 23 accessible part of the top level of the grid 4 and the stalled container handling vehicle 9'. The identification of a suitable set of storage columns 5 may be performed automatically by a computerized control system or manually by an operator;

if one or more of the storage columns 5 forming the continuous section is not completely filled with containers 6; directing at least one of the container handling vehicles 9''' to transfer containers 6 into the one or more storage columns 5, such that any of the storage columns 5 in the section is full of containers 6 before a floor element 21 is arranged at the top end; and arranging a floor element 21 at the top end of each storage column (5) in the set of adjacent storage columns by at least one of the container handling vehicles 9''', that a walkway 33 is formed between the operator 23 accessible part 32 of the top level of the grid 4 and the stalled container handling vehicle 9'.

An operator 23 accessible part is a part of the top level of the grid which an operator may easily reach. In the system shown in FIGS. 3 and 5-8, the operator 23 accessible part is the part of the grid adjacent to a platform 32, see FIG. 5a, arranged at the periphery of the top level of the grid 4. Access to the platform 32 may be by any suitable means, such as stairs etc. Various other means for providing an operator access to the operator 23 accessible part are easily conceived and/or well-known to the skilled person.

The floor elements 21 are arranged at a level allowing the container-handling vehicles 9 to pass over the floor elements 21 and the walkway 33. Thus, during the formation of the walkway 33 (i.e., during performance of the method above), any container-handling vehicle 9 not participating in arranging the walkway may continue performing their assigned storage/retrieval operations uninterrupted. This feature is highly advantageous in an automated storage system designed for continuous operation 24/7.

When the walkway 33 has been formed, the system is temporarily shut down while the operator is present upon the grid 4 to perform the required repair/service.

In the present embodiment, the floor element(s) 21 is arranged at the top end of each storage column 5 in the set of adjacent storage columns 28 by at least one of the container handling vehicles 9'''. However, even if less advantageous, the floor element(s) may also be arranged manually in a stepwise manner starting from the operator 23 accessible part 32, or alternatively by use of a vehicle dedicated to this particular purpose (not shown).

Figure 8:
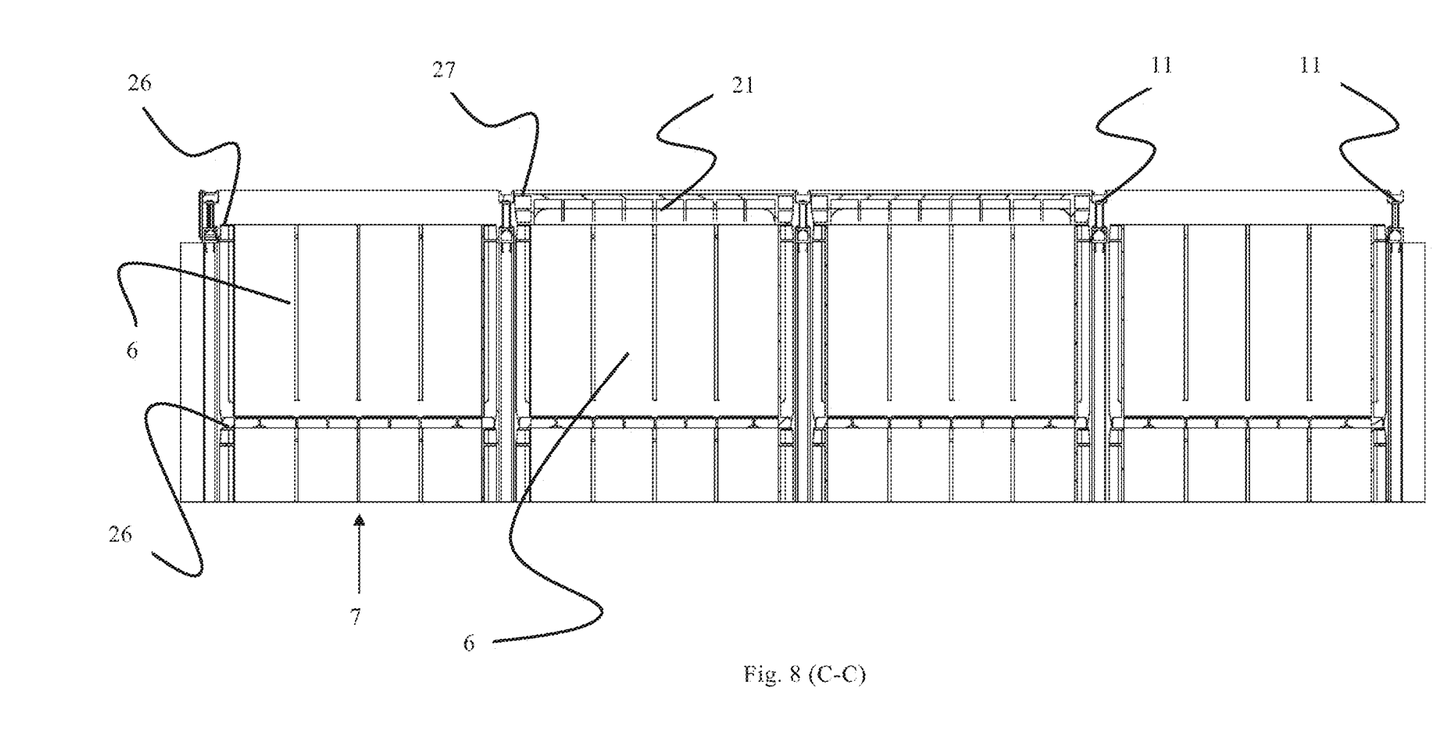
FIG. 8 is a cross-sectional view of section B in FIG. 7b along C-C.

The floor elements 21 of the present embodiment are supported on top of an uppermost container 6 in the storage column, i.e., on top of a full stack 7 of containers, see FIG. 8. In alternative embodiments, each of the floor elements may for instance have a periphery interacting with the rails 10, 11 surrounding the top end 22 of the storage columns 5 (or rail interacting elements at the periphery interacting with the rails), such that the floor elements 21 are not dependent on being supported by a stack 7 of containers 6, but are supported by/on the rails 10, 11. Preferably, the rail interaction does not prevent a container-handling vehicle 9 from moving on the rails 10, 11 with which the floor elements interact, since this may require that the storage/retrieval operations are interrupted during formation of the walkway 33. In such alternative embodiments, the floor elements 21 may for instance be stored in a dedicated floor element column having a cross-section larger than the storage columns.

To provide an increased security for an operator present on the walkway 33, the floor elements are preferably made in a colour different from the colour of the containers, preferably providing a high visibility contrast between the floor elements and the containers. The containers are commonly made in various shades of grey, and the floor elements are red, orange, yellow, green or blue, preferably red, orange or yellow.

A second embodiment of a storage system according to the invention is illustrated in FIG. 9. The main difference of the first and second embodiment is the type of container handling vehicle. The storage system in FIG. 9 features a container-handling vehicle similar to the vehicle shown in FIG. 2a, while the storage system in FIGS. 3 and 5-8 features container-handling vehicles as shown in FIG. 2b.

The three-dimensional grid 4 of a storage system according to the invention is in FIG. 3 shown to comprise 64 storage columns 5 and in FIG. 9, shown to comprise 144 storage columns 5. However, the invention is not restricted to any specific size of grid 4.

REFERENCE NUMBERS

1 Framework structure
2 Upright members/vertical profiles
3 Horizontal members/horizontal profiles
4 Storage grid
5 Storage column
6 Storage container
7 Stack (of storage containers)
8 Rail system
9 Container-handling vehicle
10 First set of parallel rails
11 Second set of parallel rails
12 Grid column
13 Vehicle body
14 First set of wheels
15 Second set of wheels
16 Lifting bands
17 Lifting frame
18 Lifting device 19 First port column, drop-off port column
20 Second port column, pick-up port column
21 Floor element
22 Top end of storage column
23 Operator
24 Container connecting element
25 Lifting frame connecting element
26 Peripheral top section of a storage container
27 Peripheral top section of a floor element
28 A section/set of adjacent storage columns
29 Cut-out
30 Guiding pin
31 Upper surface
32 Platform
33 Walkway
34 Vertical side walls
35 Rib
36 Lower surface (of a side wall)
37 Horizontal external rib
38 Vertical rib

What is claimed is:

1. A floor element for an automated storage and retrieval system, the floor element comprising:
an upper surface with a substantially rectangular horizontal periphery suitable for being accommodated in a storage column;
lifting frame connecting elements, for releasable connection to a lifting frame, on a peripheral top section of the upper surface and a cut-out at each corner of the substantially rectangular horizontal periphery for interaction with guiding pins arranged on the lifting frame; and
rail-connecting elements at the substantially rectangular horizontal periphery,
wherein the automated storage and retrieval system comprises a three-dimensional grid, a plurality of container handling vehicles, and multiple floor elements, each floor element arrangeable at a top end of a storage column on top of a vertical stack of containers, such that an operator may stand on top of the storage column, and
wherein the three-dimensional grid comprises multiple storage columns, in which containers may be stored on top of one another in vertical stacks and each container handling vehicle comprises a container lifting device having a lifting frame for releasably connecting to a container, and is operated on rails at a top level of the grid for retrieving containers from, and storing containers in, the storage columns, and for transporting the containers horizontally across the grid.

2. A floor element according to claim 1, wherein the floor element has a colour different from the colour of the containers in the automated storage and retrieval system providing a high visibility contrast between the floor element and the containers, the colour chosen from the group of red, orange, yellow, green and blue.

3. A floor element according to claim 1 further comprising two lifting frame connecting elements at each of two parallel and opposite sides of the upper surface.

4. A floor element according to claim 1, wherein the upper surface is textured to provide an improved grip.

5. A floor element according to claim 1 further comprising four lifting frame connecting elements in a shape of rectangular holes.

6. A floor element according to claim 1 further comprising vertical side walls interconnected by a grid of multiple ribs.

7. A floor element according to claim 6, wherein the vertical side walls comprise a horizontal rib and multiple vertical ribs, the ribs arranged on an outward facing side of the side walls.

8. A floor element according to claim 7, wherein the horizontal rib comprises rectangular holes.

9. A floor element according to claim 6, wherein a height of the floor element or the vertical side walls are in a range of 50-100 mm.

10. A floor element according to claim 1, wherein the floor element is moulded in a plastic material.

* * * * *